United States Patent [19]

Birecki

[11] Patent Number: 4,893,910
[45] Date of Patent: Jan. 16, 1990

[54] MAGNETO-OPTICAL RECORDING SYSTEM HAVING MEDIUM WITH DOMAINLESS CONTROL LAYER

[75] Inventor: Henryk Birecki, Palo Alto, Calif.

[73] Assignee: Hewlett-Packard Company, Palo Alto, Calif.

[21] Appl. No.: 168,710

[22] Filed: Mar. 16, 1988

[51] Int. Cl.⁴ .............................................. G02F 1/29
[52] U.S. Cl. ..................................... 350/377; 350/376
[58] Field of Search ........................ 350/377, 375, 376

[56] References Cited

U.S. PATENT DOCUMENTS

| | | | |
|---|---|---|---|
| 3,680,065 | 7/1972 | Almasi et al. | 350/377 X |
| 3,899,780 | 8/1975 | Otala | 350/377 X |
| 4,649,519 | 3/1987 | Sun et al. | 365/122 |

FOREIGN PATENT DOCUMENTS

0277480A2 12/1985 European Pat. Off.

OTHER PUBLICATIONS

Stoffel, A. M., "Thin-Film Magneto-Optic Read-Write Memory Element," IBM Technical Disclosure Bulletin, vol. 12, No. 1, Jun., 1969, pp. 209-210.
T. Nomura, "Recent Trends in Magneto-Optic Disk", Technocrat, vol. 16, No. 3, 3/83.
"Magneto-Optic Recording Erase Method," IBM Technical Disclosure Bulletin, vol. 29, No. 5, 10/86.
"Overwrite System of Magneto-Optical Disk System". Nippon Kogaku, K.K., Information Storage Products Division.
Sheih, H. P. D., and M. H. Kryder, "Magneto-Optic Recording Materials with Direct Overwrite Capability". Applied Physics Letters, vol. 49, No. 8, 8/86.
Sheih, H. P. D., and M. H. Kryder, "Operating Margins for Magneto-Optic Recording Materials with Direct Overwrite Capability". IEEE Transactions of Magnetics, vol. 23, No. 1, 1/87.

Primary Examiner—Bruce Y. Arnold
Assistant Examiner—Terry S. Callaghan
Attorney, Agent, or Firm—William H. F. Howard

[57] ABSTRACT

An information storage system records on a medium with a magneto-optical storage layer and a ferrimagnetic control layer. A higher power write beam is used to impose an upward magnetic orientation and a lower power write beam is used to impose a downward magnetic orientation in the domain. The control layer has an initial downward magnetic orientation, the magnetization of regions of the control layer can be inverted to an upward orientation temporarily while the region is heated above a compensation temperature. The magnetization of the region is restored to its initial downward orientation upon restoration of ambient temperature since neither the higher power nor the lower power write beam heats the control layer to its Curie temperature. The distributed optical and thermal properties of the medium are selected so that, upon heating of the medium by dissipated laser energy, the peak temperature of the control layer occurs after the peak temperature for the storage layer. When the higher power write beam is used, the domain cools through its Curie temperature before the corresponding region cools through its compensation temperature so that an upward magnetic orientation is established in the domain. When the lower power write beam is used, the domain cools through its Curie temperature after the corresponding region cools through its compensation temperature so that a downward magnetic orientation is established in the domain.

24 Claims, 2 Drawing Sheets

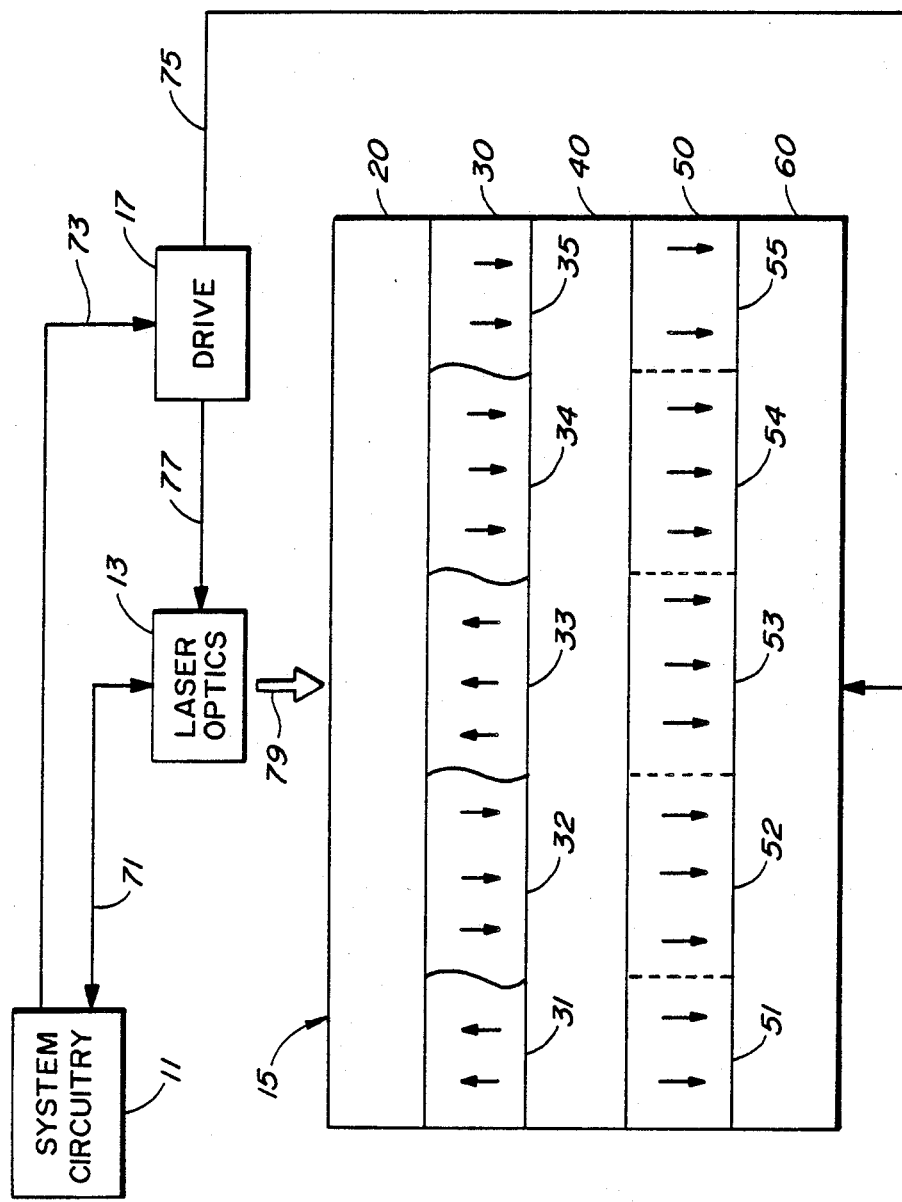
FIG._1.

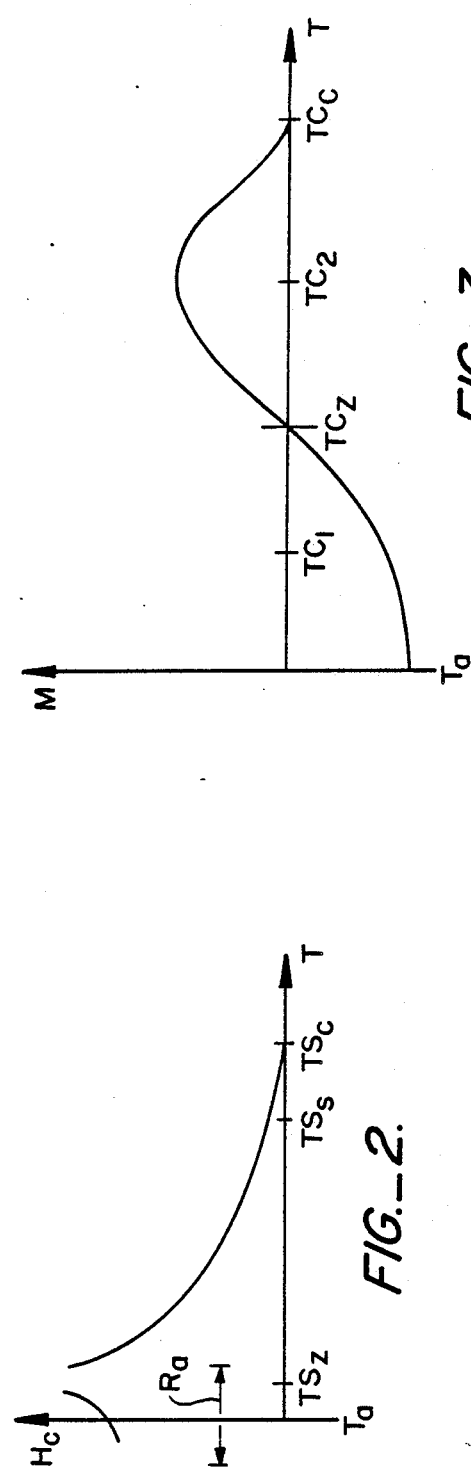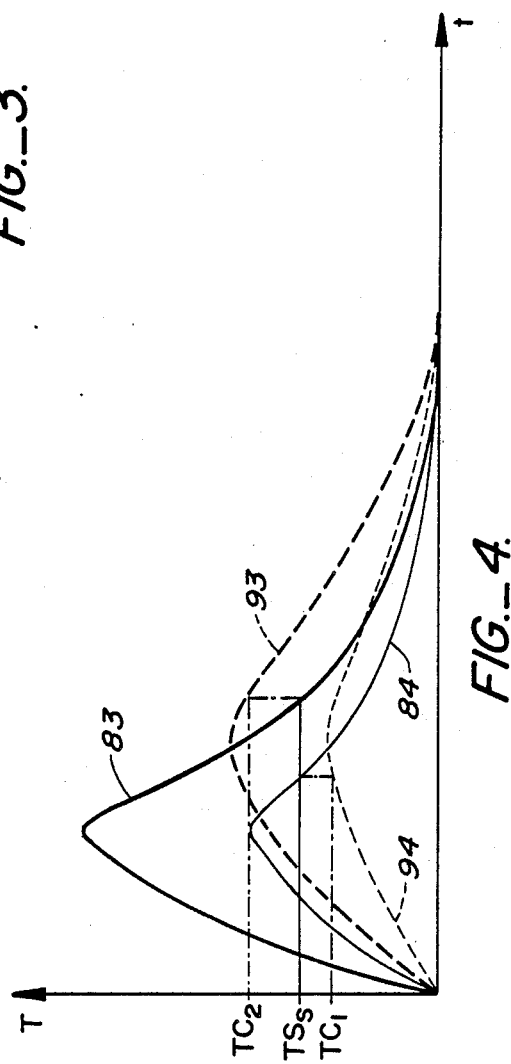

MAGNETO-OPTICAL RECORDING SYSTEM HAVING MEDIUM WITH DOMAINLESS CONTROL LAYER

BACKGROUND OF THE INVENTION

The present invention relates to laser-based information recording systems and, more particularly, to such systems providing for rewriting on magneto-optical media. A major objective of the present invention is to provide an improved laser-based information recording system which can write without requiring separate read or erase steps.

Magneto-optical systems combine the high information storage densities achievable using optical media with the rewrite capability characteristic of magnetic recording systems. A magneto-optical medium typically includes a storage layer with a large number of magnetic domains, each of which can store a bit of binary data in the form of an upward or downward spin orientation. The polarization of laser light reflected by such a domain is rotated, either clockwise or counter clockwise, as a function of the spin orientation of the domain due to a "magneto-optic effect".

A magneto-optical medium can be read by illuminating each domain with linearly polarized light and analyzing the reflection from each domain using a polarization analyzer and an intensity detector. The detector and axis of the polarization analyzer are aligned so that maximal reflected light is detected when, for example, the magneto-optic effect has resulted in a clockwise rotation in the reflected linearly polarized light. Linearly polarized light rotated in the opposite direction results in a lower intensity at the detector. Thus intensity at the detector represents the direction of rotation of linearly polarized light, which in turn represents the spin orientation of the domain reflecting the light. Thus data encoded in the form of spin orientations can be read out in the form of light intensities. More sophisticated systems use differential sensing of complementary polarization states to improve common mode rejection.

Domain spin orientation can be thermomagnetically controlled. The preferred magneto-optic materials are amorphous ferrimagnetic rare-earth transition metal thin films enclosed by glass or plastic protective layers. The ferrimagnetic film materials are selected with perpendicular uniaxial anisotropy so that magnetization lies perpendicular to the film plane. Preferably, the compensation point, where coercivity is maximal, is near the predetermined ambient temperature to ensure that external fields and the read process itself do not disturb stored information. For these materials, coercivity (Hc) is high, e.g., several thousand Oersteds (kOe), at ambient temperature, but relatively low e.g., a few hundred Oersteds, within an elevated temperature range. The spin orientation of a domain can be established by a local magnetic field while the domain is heated. Heat can be applied locally using a laser pulse to select the spin orientation of a single domain without affecting neighboring domains.

The challenge of magneto-optical recording is to achieve direct, bit-by-bit, overwrite capability. In other words, a section of medium should be rewrittable without prior erasure and without respect to what information was previously contained in that section. Simplicity and speed of the writing process are critical in view of the great storage densities, on the order of $10^8$ bit/cm$^2$ or more, and the resulting vast storage capacities, measured in gigabytes, attainable using magneto-optical media.

Difficulties in achieving high-frequency switching of a magnetic field over large areas of a medium constrain writing speed. Systems employing high speed magnetic switching are discussed in the background to U.S. Pat. No. 4,649,519 to Sun et al. This switching limitation can be avoided by writing in two passes, one for each magnetic field direction. In each pass, a write laser is modulated to illuminate only those domains to be oriented along the magnetic field present. Typically, the first pass is an erase, in which the section of the medium to be rewritten is initialized to one orientation using a constant magnetic field and light intensity. The magnetic field is then reversed and the light modulated to switch the orientations of selected domains.

The requirement for two passes renders the rewriting process unduly slow. At a considerable cost in complexity, the speed problem can be ameliorated by a systems approach as described in "Magneto-Optic Recording Erase Method", IBM technical disclosure Vol. 29, No. 5, Oct. 1986. This systems approach provides for certain operations to be delayed until "free time" is available. However, in applications such as "video interactive" and disk-based memory caching, such free time may not be available.

More complex magneto-optical media have been used to eliminate the requirement for two-pass rewriting. In addition to including the standard magneto-optical storage layer, these media include a magnetic control layer in which magnetic domains are formed to provide localized biases during a write operation. One-pass rewriting is implemented without requiring high-speed magnetic switching.

One such system is disclosed in German Pat. No. 3,619,618, assigned to Nippon Kogaku, K.K. This system uses a media with a control (reference) magnetic layer below the read (memory) layer. Prior to a write operation, all the domains of the control layer are initialized to an initial orientation using a relatively strong external magnetic field. This external field, which does not affect the data layer, can be applied by an electromagnet outside the medium. During a write operation, the control layer is exposed to a second external magnetic field with an orientation opposite to the initializing field. This second external field is relatively weak so that it does not affect the orientation of a control domain unless that domain is heated to its Curie temperature. One magnetic orientation is imposed on a storage domain by heating it above its Curie temperature so that the associated control domain remains below its Curie temperature by using a relatively low power write beam. The opposite magnetic orientation is imposed on a storage domain by heating both it and the associated control domain above their respective Curie temperatures. The storage domain assumes the orientation of the control domain which is determined by the magnetic orientation of the externally applied field. Those control domains inverted during the write operation are reinitialized to the initial magnetic orientation before the next write operation. While this system does allow direct bit-by-bit overwrite of the storage layer, two external magnets are required to set and then clear domains of the control layer. The storage and control layers are in contact so that the incorporating system relies on exchange interaction, rendering the system difficult to manufacture and sensitive to ambient temperature variations.

Systems requiring neither external magnetic elements nor separate erase steps for either the read or control layers have been disclosed in U.S. Pat. No. 4,649,519 to Sun et al. and by Han-Ping Shieh and Mark H. Kryder in "Magneto-Optic Recording Materials with Direct Overwrite Capability", Applied Physics Letters, Vol. 49, No. 8, Aug. 25, 1986. Both these systems employ write techniques which operate to invert the spin orientation domain from its previous state. The advantage of these systems is that the spin orientation can be controlled by flipping or not flipping as required. The disadvantage of this approach is that the prior state of the domain must be known prior to writing. This can be achieved in a single read-before-write pass, but it still requires the separate read procedure. In addition, a source of error is introduced since misreading a domain forces a write error. Furthermore, since writing has to occur exactly at the same place every time, timing constraints are impracticably severe. Thus, these write-after-read systems are disadvantageous in that they are more complex and more prone to error than is desirable.

What is needed, which has not been provided heretofore, is a system which provides the durability and storage capabilities of optical media and the recording convenience of magnetic media. It should not require separate erase operations between write operations, either in a storage layer or in a control layer. It should not require reading prior state before writing. In addition, it should not require high speed switching of an external magnet. In short, what is needed is an optically readable media which does not require separate erase and read steps during recording.

SUMMARY OF THE INVENTION

In accordance with the present invention, a laser-based information recording system includes a laser optics module, a magneto-optical medium, a drive mechanism and system circuitry. The medium includes a magneto-optic storage layer and a magnetic control layer. The control layer has a fixed initialization state, for example, it has a uniformly downward spin orientation at ambient temperature. The control layer is "domainless" in that there are no separate domains either preexisting or formed during the write process.

Domains are characterized by the presence of domain walls, which are present through the storage layer. The domain structure of the storage layer ensures that a magnetic orientation established at an elevated temperature is maintained upon a return of a domain to ambient temperature. Domain walls are not formed in the control layer. Therefore, control layers regions which undergo magnetic inversions due to elevated temperatures, reacquire their initial orientation while cooling to ambient temperature.

The laser optics module provides two laser beam types corresponding to respective bit values, e.g., logic high and logic low. Both laser beam types are sufficient to heat a storage domain to near or above its Curie temperature so that its magnetic orientation can be determined by a locally applied magnetic field. Neither laser beam type delivers sufficient energy to form a domain in the control layer. Exactly one of the two laser beam types delivers, directly and/or indirectly, sufficient energy to a region of the control layer to invert the net magnetic field at the associated storage domain.

Critical parameters for the present invention include the storage layer switching temperature and switching point. The magnetic orientation of a storage domain can be set by an applied magnetic field as long as the magnitude of the field is greater than the coercivity of the domain. At its Curie temperature, a domain has zero coercivity so its magnetic orientation can be set by a very small magnetic field. Below the Curie temperature, coercivity increases with decreasing temperature. Generally, the magnetic orientation for a domain is set when, while cooling, its coercivity first exceeds the magnitude of the locally applied field. The temperature at which this occurs is the storage switching temperature $T_{Ss}$ and the time at which this occurs is the switching point. The storage switching temperature and time are a function of the storage layer material and of the strength of the applied field. Where the applied field is varying, the storage switching temperature is a function of time as well.

After exposure to a laser beam of the first type, a storage domain cools through a switching temperature while an inverted field is applied by an appropriately heated control region. After exposure to a laser beam of the second type, the storage domains cools through a switching temperature while the control region still has or has resumed its initial magnetic orientation.

To create the foregoing effects, the magnetic field direction at a storage domain must be a function of the temperature of the control region. Preferably, the control region is a ferrimagnetic material having its compensation temperature well above ambient temperature. The first type laser beam can be selected so that the control region is above its compensation temperature when the storage domain cools through the switching temperature, while the second laser beam type can be selected so that the control region is below its compensation temperature when the storage domain cools through the switching temperature.

Alternatively, the field at the storage domain can be the sum of fields applied by the control layer and a bias field. The control layer can be a ferrimagnetic material and the bias field applied so that the temperature at which field direction at the read domain inverts is shifted from the compensation temperature to a "zero-net-field" temperature. Alternatively, the control layer can be ferromagnetic and the bias field applied to create a zero-net-field temperature. In any event, the laser beam types must be selected so that one causes the control region to be above, and the other causes it to be below, the zero-net-field temperature when the read domain cools through its switching temperature.

To cause these different results, the first and second laser beam types must differ from one another in one or more parameters, including power related parameters such as pulse amplitude, pulse width, and pulse number, and other parameters such as wavelength and polarization. In addition, the distinguishing parameters must be coordinated with the distributed optical and thermal properties of the medium so that the desired effects are achieved to the desired degree.

The phrase "distributed optical and thermal properties" refers to the fact that the medium is constituted by several layers. In addition to the magnetic storage and the control layers, a medium can include other layers. Specifically, a storage protect layer can provide protection at the otherwise exposed surface of the storage layer from environmental effects and damage due to handling. An analogous function can be supplied by a control protect layer. Furthermore, being thin film products, some media include a substrate which can, for example, be integrated into the storage protect layer. In addition, an intermediate dielectric layer is preferably disposed between the storage layer and the control layer.

Each of these layers interact with light and heat in characteristic and generally distinctive ways. Furthermore, the effect of a layer on incident light can depend on temperature. Small changes in thicknesses can have large effects on the interference pattern in incident laser beams, which in turn affect the amount and dispersion of light reflected and absorbed by each layer. Those skilled in the optical media art are familiar with the considerations involved in adjusting individual layers to obtain the desired aggregate characteristics for the medium, which are a function of the distributed optical and thermal properties of the medium.

One preferred approach for effecting different storage domain orientations is to arrange the distributed optical and thermal properties so that when a beam is directed at the storage domain, it attains a peak temperature before the associated control region attains a peak temperature. This can occur, for example, where the domain is heated directly by the laser beam and the region is heated primarily by conduction of heat from laser energy dissipated in the storage and intermediate layers. The thickness of the intermediate dielectric layer can be adjusted to optimize the staggering of the temperature peaks. When peak temperatures are properly staggered, field direction at the switching point can be controlled readily be selecting appropriate laser beam powers.

Alternatively, field direction at the switching point can be controlled without peak staggering or using principles in addition to peak staggering. For example, a logic high can be written using a laser beam characterized by a wavelength absorbed predominantly by the storage layer, while a logic low is written using a laser beam combination of the wavelength absorbed predominantly by the storage layer and a wavelength absorbed predominantly by the control layer. Alternatively, the intermediate dielectric layer can be made to transmit preferentially one of two beam types differing in wavelength. In either case, the proportion of energy absorbed by the control region can be varied without greatly varying the amount of energy used to heat the read domain to about its Curie point. Other alternatives are suggested in the subsequent detailed description.

Neither beam type elevates the control layer above its Curie temperature so that no permanent domains are formed in the control layer. Upon continued cooling, a region of reversed spin orientation reverts to its initialization spin orientation. No external magnetic field and no separate erasure procedure is required. Recording is accomplished without the separate read or erase procedures used in the systems described in the background section above. Thus, the present invention provides for the recording convenience of conventional magnetic media while affording the information density advantages of optical media. Other features and advantages of the present invention are apparent from the description below with reference to the following drawings.

BRIEF DESCRIPTION OF THE DRAWINGS

FIG. 1 is a schematic diagram of a magneto-optical information storage system in accordance with the present invention.

FIG. 2 is a graph of a coercivity profile as a function of temperature for a storage layer of a medium of the system of FIG. 1.

FIG. 3 is a graph of a magnetization profile as a function of temperature for a control layer of the medium of the system of FIG. 1.

FIG. 4 is a graph of temperature versus time for the storage layer and the control layer for two different laser power levels.

DESCRIPTION OF THE PREFERRED EMBODIMENTS

A laser-based information recording system in accordance with the present invention comprises system circuitry 11, a laser optics module 13, a magneto-optical medium 15, and a drive mechanism 17, as shown in FIG. 1. Medium 15 includes a storage protect layer 20, a storage layer 30, an intermediate dielectric layer 40, a control layer 50 and a control protect layer 60. Storage layer 30 includes many magnetic domains, including domains 31, 32, 33, 34 and 35. The magnetic orientations of domains 31-35 are defined by fields generated by respective regions 51, 52, 53, 54 and 55 of control layer 50 at the time of writing.

A bus 71 carries data, control and status signals between system circuity 11 and laser optics module 13. System circuitry 11 also controls the relative movement of laser optics module 13 and medium 15 by sending drive control signals over bus 73 to drive mechanism 17. Drive mechanism 17 controls, via link 75, relative circumferential movement by causing medium 15 to spin. Drive mechanism 17 controls relative radial movement, via link 77, by linearly translating laser optics module 13.

When aligned with medium 15 as illustrated, laser optics module 13 can deliver a high power write pulse and a low power write pulse along light path 79 to a vertical region of medium 15 including storage domain 33 and adjacent control region 53. Both the low and high power pulses are sufficient to heat storage domain 33 above its Curie temperature. Subsequently, storage domain 33 cools through a switching temperature $TS_s$, below which its magnetization is fixed.

The thermal and optical properties of medium 15 are such that as storage domain 33 cools through its switching temperature, control region 53 is above its compensation temperature in the case of a high power pulse and below its compensation temperature in the case of a low power pulse. This difference vis-a-vis compensation temperature allows the high power pulse to write a "1" in the form of upward magnetization as shown with respect to storage domain 33, while a lower power pulse can be used to write a "0" in the form of downward magnetization as shown with respect to storage domain 34. Since control regions 51-55 are never heated above their Curie temperatures, they all resume their initial magnetization, downward as illustrated, upon cooling to ambient temperature. The write procedure and the switching temperature are defined more precisely below with reference to FIG. 4.

Medium 15 is fabricated using thin film techniques which build a stratified structure on a substrate. A glass or plastic substrate is included in storage protect layer 20, which also includes a protective sublayer between the substrate and storage layer 30 to isolate the latter from contaminants in the substrate. The protective sublayer can be a thin film deposition of silicon dioxide. The substrate is rigid and about 1 mm thick. Surface features are etched or molded into the substrate surface facing the storage layer to define storage domain locations. Layer 20 is transparent to allow laser light along path 79 to reach storage layer 30.

Storage layer 30 is a rare earth transition metal alloy, such as terbium-iron, gadolinium-terbium-iron, or terbium-iron-cobalt. Storage layer 30 can be about 20 nanometers (nm) to 30 nm thick. Storage layer 30 is selected to have a relatively strong magneto-optic effect on incident light to facilitate reading. FIG. 2 shows the coercivity Hc of storage layer 30 as a function of temperature T. As the graph of FIG. 2 indicates, storage layer 30 is of ferrimagnetic material with a compensation temperature $TS_z$ near a base or ambient temperature $T_a$ and within an ambient temperature range $R_a$. The switching temperature $TS_s$ is below, but near, the storage layer Curie temperature $TS_c$.

Intermediate dielectric layer 40 is selected to provide the desired temporal staggering of the thermal peaks for the storage and control layers. In fact, all layers 20-60 contribute to the overall optical and thermal characteristic of medium 15 and the present invention can be practiced without an intermediate dielectric. However, the presence of intermediate dielectric 40 adds a degree of design freedom in optimizing the overall thermal and optical characteristics of medium 15. In addition, intermediate dielectric 40 serves to break the atom-to-atom exchange interaction between storage layer 30 and control layer 50, limiting their interaction to more easily controlled near field interactions.

Control layer 50 is of ferrimagnetic material with its compensation temperature $TC_z$ significantly above ambient temperature $T_a$. During manufacture, control layer 50 is initialized with the downward magnetization represented in FIG. 1. As indicated in graph of magnetization M versus temperature T of FIG. 3, control layer 50 maintains its initialized magnetization direction while between ambient temperature $T_a$ and the control layer compensation temperature $TC_z$. Between the control layer compensation temperature $TC_z$ and the control layer Curie temperature $TC_c$, control layer 50 inverts to upward magnetization, achieving a peak field strength at $TC_2$ before diminishing to zero magnetization at control layer Curie temperature $TC_c$. $TC_1$ indicates a temperature below control layer compensation temperature $TC_z$ where the field strength is opposite and about equal to that at $TC_2$. Referring to FIG. 1, control layer 50 is protected from below by control protect layer 60, which can be of photoresist, polyimide or silicon dioxide and about 1 $\mu$m thick.

The writing process is explained with reference to FIG. 4, which depicts four temperature profiles over time t. Profile 83 characterizes storage domain 33 during and after application of a high power write pulse, while profile 93 characterizes control region 53 during and after the application of a high power write pulse. Profile 84 characterizes storage domain 34 during and after application of a low power pulse, while profile 94 characterizes control region 54 during and after application of a low power write pulse.

For a given layer, the time peak temperature occurs is not very sensitive to pulse power. Specifically, the peaks for storage domain profiles 83 and 84 occur at about the same time, although different amplitudes are achieved. The peaks for control region profiles 93 and 94 have an analogous relationship. More importantly, the peaks for control region profiles 93 and 94 occur after the peaks for the corresponding storage domain profiles 83 and 84.

This temporal staggering of peaks renders the write process more responsive to write beam power. In the case of a high power pulse, when storage domain profile 83 cools to switching temperature $TS_s$, control region profile 93 is at temperature $TC_2$, above compensation temperature $TC_z$. Thus, at this time, control region 53 is characterized by an inverted upward magnetization and this magnetization is imposed on storage domain 33. As ambient temperature $T_a$ is resumed, the upward magnetization remains fixed in storage domain 33 while control region 53 recovers its initialized downward magnetization. This is the situation depicted by the magnetization arrows in domain 33 and region 53 of FIG. 1.

In the case of a lower power pulse, when storage domain profile 84 cools through switching temperature $TS_s$, control region profile 94 has fallen below control layer compensation temperature $TC_z$ to temperature $TC_1$; thus, a downward magnetization is imposed on storage domain 34 as it resumes ambient temperature $T_a$. The magnetizations of storage domain 34 and associated control region 54 at ambient temperature after a lower power write pulse are depicted by the magnetization arrows at their respective locations in FIG. 1.

Switching temperature $TS_s$ occurs when the field applied by control layer 50 at storage domain 33 equals the coercivity Hc of storage domain 33 during cooling. While $TS_s$ lies between the storage layer compensation temperature $TS_z$ and the storage layer Curie temperature $TC_c$, $TS_s$ is a function of several variables. $TS_s$ is a function of the storage domain coercivity Hc versus temperature T profile depicted in FIG. 2. $TS_s$ is a function of the control layer magnetization M versus temperature T profile of FIG. 3, this variable being qualified in that it is the field at a storage domain rather than the magnetization of a control region that is of direct interest. $TS_s$ is also a function of the temporal relationships between the profiles of FIGS. 2 and 3 since that determines when, and therefore at what temperature, coercivity and field strength match for a given laser pulse power. In fact, the value of $TS_s$ when a logic high is written is not normally the same as the value when a logic low is written. Generally, this difference is not large and its effects can be minimized where coercivity changes sensitively with temperature.

As indicated, switching temperature is variable. It is bounded above by the storage layer Curie temperature. It is bounded from below by the maximum net field definable by a control region. Generally, the maximum strength for an inverted field direction is different from, and typically less than, the maximum strength for an initialization direction. Thus, there are two different lower bounds for the switching temperature. The switching temperature occurs just as the coercivity of the domain rises above the net-applied-field.

The selected high and lower laser pulse powers should be optimized for each set of selected materials and dimensions for medium 15. The optimal characterizations for the laser pulse types and the layers of the medium are closely intertwined. The pulse types needed for writing depend on the collective and individual thermal and optical properties of the layers. The thermal characteristics of the intermediate dielectric layer, for example, are dependent on its optical characteristics as well as the optical characteristics of the other layers. Those skilled in the are are accustomed to fine tuning materials, thicknesses and other specifications so that the medium as a whole has a desired set of properties. In the present case, thermal, optical and magnetic properties are adjusted until all layers work as above with the laser pulse types used.

Many alternatives to the foregoing embodiment are provided for by the present invention. The present invention provides for different forms for the media, including flat strips and tape on a reel, in addition to diskshaped media. The present invention provides for sublayers within layers. For example, the intermediate dielectric layer can include sublayers with different thermal and optical properties. The storage protect layer can include a separate layer for defining domain locations in the storage layer. The present invention also provides for additional layers. A two-sided disk can be formed with the control layer between two storage layers, for example. Also an additional magnetic layer can be used as a bias layer, as described below.

The control layer can be of ferromagnetic material. Ferromagnetic material also changes magnetization as a function of temperature. However, the change is basically a decrease in field magnitude without a change in field direction. By using a bias field of opposite polarity, the net field at the storage domain can be made to have the required zero crossover. The bias field can be applied by adding a fixed magnetic layer to the disk or by using an external magnetic source such as a permanent magnet or an electro-magnet built into a platter of the drive mechanism. In one embodiment, control layer 50 is of ferromagnetic material and control protect layer 60 includes a magnetic bias sublayer.

Optical properties of the control layer can be exploited in accordance with the present invention. During read operations, the control layer can have a uniform spin polarization which can be used to bias the magneto-optic rotation experienced by light reflected from the medium. Many optical detectors require two beam-splitting mirrors in their read optics, one to separate incident and reflected laser light and another to distinguish the two possible rotations in the reflected light. The reason that the first beam-splitting mirror cannot also be used in detection is that the rotation by the storage layer is symmetric; one cannot use an intensity detector to distinguish the two rotational directions. However, by biasing the magneto-optic rotation is biased, a polarizing beam-splitter used on the incident beam reflects different amounts of reflected light depending on the direction of magneto-optic rotation. Hence, less expensive electronics and a single beam-splitting mirror are required for an intensity-based detection.

Embodiments without an intermediate dielectric layer are provided for. Such embodiments can make use of the exchange magnetization between the read and control layers. Also, they can rely on the inherent optical and thermal properties of these layers to provide the desired write functions.

Different laser beam wavelengths can be used for logic high and logic low writes, respectively. For example, a logic low can be written using a laser beam of a wavelength absorbed predominantly by the storage layer so khat the control layer is not heated above its compensation point; a write high is effected using a combination of the first wavelength and another wavelength absorbed predominately by the control layer. Thus "laser beam type" can refer to a combination of laser beams or a laser beam characterized by two or more discrete wavelengths. Such preferential absorption does not have to be characteristic of materials comprising the storage and control layers, but can come about by appropriate selection of distributed optical structure.

Alternatively, an intermediate dielectric layer could be selected to absorb or transmit the wavelength to be used when the control layer region is to change field directions and to reflect the wavelength to be used when the initialized field direction is to be applied to the domain layer. The power delivered by a laser beam can be controlled by varying the amplitude or pulse width of a single pulse or by controlling the number of pulses in the beam, each pulse having a fixed amplitude and pulse width. Alternatively or supplementally, the other layers have thermal or optical properties which vary according to which laser pulse wavelength is used.

In general, two laser beam types interact with the medium as follows. One heats a domain and an associated region so that the domain acquires and, upon cooling, maintains one orientation. The other laser beam type heats a domain while limiting heating of the associated control region so that the domain acquires and, upon cooling, maintains the opposite orientation. In both cases, the domain is heated above a switching temperature, which, as indicated above, is a function of other variables. In general, the switching temperature is near the Curie temperature so that in practice, writing to a domain involves heating it above its Curie point.

To impose a spin orientation on a domain opposite from the orientation defined by the initial magnetization of the control layer, the control layer must be heated above the net-zero-temperature. Where the control layer is ferrimagnetic and no bias field is applied, the net-zero-temperature is the compensation temperature for the control layer. Moreover, the respective control region must be maintained above the net-zero-temperature as the domain cools through the switching temperature. To write using the initial field direction, the control region can be: (1) not heated at all; (2) heated to a temperature below its net-zero-temperature; (3) heated to a temperature equal to or above its net-zero-temperature so that it cools through the net-zero-temperature before the domain cools through the switching temperature; or (4) heated to a temperature equal to or above its net-zero-temperature, with heating delayed so that the region rises above the net-zero-temperature after the domain cools through the switching temperature.

So that the two laser beam types have the described differential effects: (1) different powers can be used; (2) the thermal properties of the medium can be distributed so that the domain achieves a peak temperature either before or after the respective control region achieves its peak temperature; (3) the shapes of the temperature profiles for the control region and the associated domain can be properly selected; (4) the laser beam types can differ according to spectral distribution, power or other parameter which is differentially acted on by at least one of the layers of the medium; (5) a combination of two or more of the above; and (6) other than the above. It is clear to those skilled in the art that there are a variety of ways of implementing these relationships between the layers and the laser beam types.

Transmissive systems are provided for as well as the reflective systems described above. In such a system, a read beam is transmitted through a medium to be analyzed on the other side. These and other variations upon and modifications to the illustrated embodiment are provided for by the present invention, the scope of which is limited only by the following claims.

What is claimed is:

1. A system comprising:
   a medium having distributed optical and thermal properties, said medium including a magneto-optical storage layer and a magnetic control laser, said medium having a predetermined ambient temperature range;
   said storage layer having at least one domain which can alternatively acquire a first magnetic orientation and a second magnetic orientation,
   said control layer having a control layer Curie temperature, said control layer including a region the temperature of which determines the magnitude and direction of a magnetic field applied at said domain so as to define a zero-net-field temperature at which said field has substantially zero magnitude, said field having an initial direction when said region is between said ambient temperature range and said zero-net-field temperature, said zero-net-field temperature being above said ambient temperature range and below said control layer Curie temperature, said field having an inverted direction when said region is between said zero-net-field temperature and said control layer Curie temperature;
   said distributed optical and thermal properties being selected so that there exists:
      a first laser beam type that when directed toward said domain causes said domain to be heated to a first peak domain temperature and causes said region to be heated to a first peak region temperature above said zero-net-field temperature and below said control layer Curie temperature so that said domain cools through its switching temperature before said region cools through its zero-net-field temperature, and
      a second laser beam type that when directed toward said domain causes said domain to be heated to a second peak domain temperature and causes said region to be heated to a second peak temperature above said zero-net field temperature and below said first peak region temperature so that said domain cools through its switching temperature after said region cools through its zero-net-field temperature.

2. The system of claim 1 wherein said intial direction is opposed to said first magnetic orientation and said inverted direction is opposed to said second magnetic orientation.

3. The system of claim 2 wherein said first peak region temperature occurs after said first peak domain temperature and said second peak region temperature occurs after said second peak domain temperature.

4. The system of claim 2 wherein said first peak region temperature occurs before said first peak domain temperature and said second peak region temperature occurs before said second peak domain temperature.

5. The system of claim 2 wherein said storage layer is ferrimagnetic so that it has a storage layer compensation temperature and a storage layer Curie temperature, said storage layer compensation temperature being in said ambient temperature range.

6. The system of claim 2 wherein said control layer is ferrimagnetic, said control layer having a compensation temperature above said ambient temperature range, below said control layer Curie temperature, and substantially equal to said zero-net-field temperature.

7. The system of claim 2 wherein said medium further includes an intermediate dielectric layer between said storage layer and said control layer.

8. The system of claim 7 wherein said intermediate dielectric layer is frequency selective and wherein said first and second laser beam types are characterized by different frequencies so that a greater proportion of energy of said first laser beam type than of said second laser beam type is absorbed in said control layer.

9. The system of claim 7 wherein said first peak control layer temperature and said second peak control layer temperature are attained at least in part by the conduction through said intermediate dielectric layer of heat generated by a respective one of said first laser beam type and said second laser beam type.

10. The system of claim 2 further comprising a storage protect layer and a control protect layer, said storage layer being between said storage protect layer and said control layer, said control layer between said control protect layer and said storage layer.

11. The system of claim 2 further comprising:
    laser means for supplying laser beams of said first and second types, said laser means being optically coupled to said medium;
    drive means for aligning said laser means with said domain, said drive means being mechanically coupled to said laser means and said medium; and
    system circuitry for controlling said drive means and said laser means, said system circuitry being communicatively coupled with said drive means and said laser means.

12. A system comprising:
    a medium having distributed optical and thermal properties, said medium including a magneto-optical storage layer and a magnetic control layer, said medium having a predetermined ambient temperature range;
    said storage layer having at least one domain which can alternatively acquire a first magnetic orientation and a second magnetic orientation,
    said control layer having a control layer Curie temperature, said control layer including a region the temperature of which determines the magnitude and direction of a magnetic field applied at said domain so as to define a zero-net-field temperature at which said field has substantially zero magnitude, said field having an initial direction when said region is between said ambient temperature range and said zero-net-field temperature, said zero-net-field temperature being above said ambient temperature range and below said control layer Curie temperature, said field having an inverted direction when said region is between said zero-net-field temperature and said control layer Curie temperature;
    said distributed optical and thermal properties being selected so that there exists:
        a first laser beam type that when directed toward said domain causes said domain to be heated to a first peak domain temperature and causes said region to be heated to a first peak region temperature above said zero-net-field temperature and below said control layer Curie temperature so that said domain cools through its switching temperature before said region cools through its zero-net-field temperature, and a second laser beam type that when directed toward said domain causes said domain to be heated to a second peak domain temperature and causes said region to be heated to a second peak temperature above said zero-net field temperature and below said first peak region temperature so that said domain cools through its switching temperature after said region cools through its zero-net-field temperature:

laser means for supplying laser beams of said first and second types, said laser means being optically coupled to said laser means and said medium;

drive means for aligning said laser means with said domain, said drive means being mechanically coupled to said laser means and said medium; and system circuitry for controlling said drive means and said laser means, said system circuitry being communicatively coupled with said drive means and said laser means.

13. The system of claim 12 wherein said first laser beam type delivers more power to said medium than does said second laser beam type so that said first domain peak temperature is greater than said second domain peak temperature and said first region peak temperature is greater than said second region peak temperature.

14. The system of claim 12 wherein said distributed optical and thermal properties are selected so that said first region peak temperature occurs after said first domain peak temperature and so that said second region peak temperature occurs after said second domain peak temperature.

15. The system of claim 12 wherein said distributed optical and thermal properties are selected so that said first region peak temperature occurs before said first domain peak temperature and so that said second region peak temperature occurs before said second domain peak temperature.

16. The system of claim 12 wherein said medium further includes an intermediate dielectric layer between said storage layer and said control layer.

17. The system of claim 16 wherein said first and second region peak temperatures are a least partially a function of dissipated laser beam heat conducted through at least a part of said intermediate dielectric layer.

18. The system of claim 12 wherein said medium further includes a frequency selective intermediate layer, said first and second laser beam types having different wavelengths so that a greater proportion of the energy of said first laser beam type than of said second laser beam type is absorbed by said region.

19. The system of claim 12 wherein said control layer is ferrimagnetic, having a compensation temperature substantially equal to said zero-net-field temperature.

20. The system of claim 12 further comprising bias field means which contributes a bias magnetic field to magnetic field at said domain defined the temperature of said region.

21. The system of claim 20 wherein said control layer is ferromagnetic.

22. The system of claim 12 wherein said medium includes a storage protect layer and a control protect layer, said storage layer being between said storage protect layer and said control layer, said control layer between said control protect layer and said storage layer.

23. The system of claim 12 wherein said second type laser beam has a spectral distribution predominantly absorbed by said storage layer and said first type laser beam has a spectral distribution providing for substantial absorption by each of said control layer and said storage layer.

24. A laser-based information recording system comprising:

a medium having distributed optical and thermal properties, said medium having a predetermined ambient temperature range, said medium having in succession a storage protect layer, a magneto-optical storage layer, an intermediate dielectric layer, a magnetic control layer and a control protect layer, said storage layer being ferrimagnetic, said storage layer having a compensation temperature within said ambient temperature range and a storage layer Curie temperature above said ambient temperature range, said storage layer having plural domains, including a first domain, each domain being capable of alternatively acquiring a first magnetization and a second magnetization, said control layer consisting primarily of ferrimagnetic material, having a control layer compensation temperature above said ambient temperature range and a control layer Curie temperature above said compensation temperature, said control layer having a first region, the temperature of which defines the magnitude and direction of a magnetic field at said first domain, said field having an initial direction while said region is within said ambient temperature range and between said ambient temperature range and said control layer compensation temperature, said initial direction being opposed to said first magnetic orientation, said field having an inverted direction while said region is at a temperature between said control layer compensation temperature and said control layer Curie temperature, said inverted direction being opposed to said second magnetic orientation;

laser means for providing a higher power write beam and a lower power write beam, said laser means being optically coupled with said medium;

drive means for effecting relative movement of said laser means and said medium, said drive means being mechanically coupled to said laser means and said medium; and system circuitry for selecting one of said higher and lower power write beams to be directed toward said domain and for controlling said drive means so that said laser means is aligned with said domain, said system circuitry being communicatively coupled with said drive means and said laser means, said distributed optical and thermal properties and said higher and lower power write beams being co-selected so that:

when said system circuitry selects said higher power write beam to be directed toward said domain then, between the onset of said higher power write beam and the subsequent return of said domain to said ambient temperature range, said region attains a first peak region temperature after said domain attains a first peak domain temperature due in part to the conduction of heat from dissipated laser energy at least partially through said intermediate dielectric layer to said region, said first peak region temperature being between said control layer compensation temperature and said control layer Curie temperature, said first domain peak temperature being above said storage layer Curie temperature, said domain cooling through said storage layer Curie temperature sufficiently before said region cools through said control layer compensation temperature so that said domain acquires said first magnetization and maintains said first magnetization upon cooling to said ambient temperature range, and when said system circuitry selects said lower power write beam to be directed toward said domain, between the onset of said lower power write beam and the subsequent return of said domain to said ambient temperature range, said region attains a second peak region temperature after said domain attains a second peak domain temperature due in part to the conduction of heat from dissipated laser energy at least partially through said intermediate dielectric layer to said region, said second peak region temperature being between said control layer compensation temperature and said control layer Curie temperature, said second domain peak temperature being above said storage layer Curie temperature, said region cooling through said control layer compensation temperature sufficiently before said storage layer cools through said storage layer Curie temperature so that said domain acquires said second magnetization and maintains said second magnetization upon cooling to said ambient temperature range.

* * * * *